Sept. 15, 1959 R. A. MAHLMEISTER 2,903,796
GAGING DEVICE
Filed June 13, 1956 2 Sheets-Sheet 1

INVENTOR.
Raymond A. Mahlmeister
BY
Edward J. Noe Jr.
atty.

United States Patent Office 2,903,796
Patented Sept. 15, 1959

2,903,796

GAGING DEVICE

Raymond A. Mahlmeister, Dayton, Ohio, assignor, by mesne assignments, to The Sheffield Corporation, a corporation of Delaware Application June 13, 1956, Serial No. 591,064

15 Claims. (Cl. 33—147)

This invention relates to gaging devices and more particularly to devices of high precision such as gage block comparators and the like.

It is an object of this invention to provide a comparator gage or the like having fine adjustment means for easily and rapidly obtaining without tedious manipulation extremely fine and precise positioning of gaging components such as adjustments of a movable work support or anvil carried on a comparator base.

It is a further object to provide a comparator gage having a gage head carried for coarse positioning relative to a work support mounted on the comparator base for movement about a rocking axis, the measuring axis of the gage head being to one side of the support rocking axis, and means being provided for precise, minute adjustments of the work support about its rocking axis to a position work carried thereby along the measuring axis.

It is a further object to provide such a fine adjustment rigidly supported in a comparator base including manually rotatable cam means and follower means cooperating between said cam means and a movable work support for obtaining fine and precise work support adjustments in response to relatively large cam movements.

It is a further object to provide a comparator adjustment as referred to above, including manually movable means having a given effective range of movement and work support actuating means controlled by the manually movable means including an amplification adjustment for varying the amount of work support movement for a given movement of the manually movable means.

It is a further object to provide a gage block comparator or the like having a fine work adjustment including a manually rotatable cam engaging a lever pivoted in the base and operative to move the work support, provision being made for endwise adjustment to shift the lever pivot axis and vary the effective lever arms, whereby the amount of work support movement for a given cam rotation can be adjusted.

Figure 1:
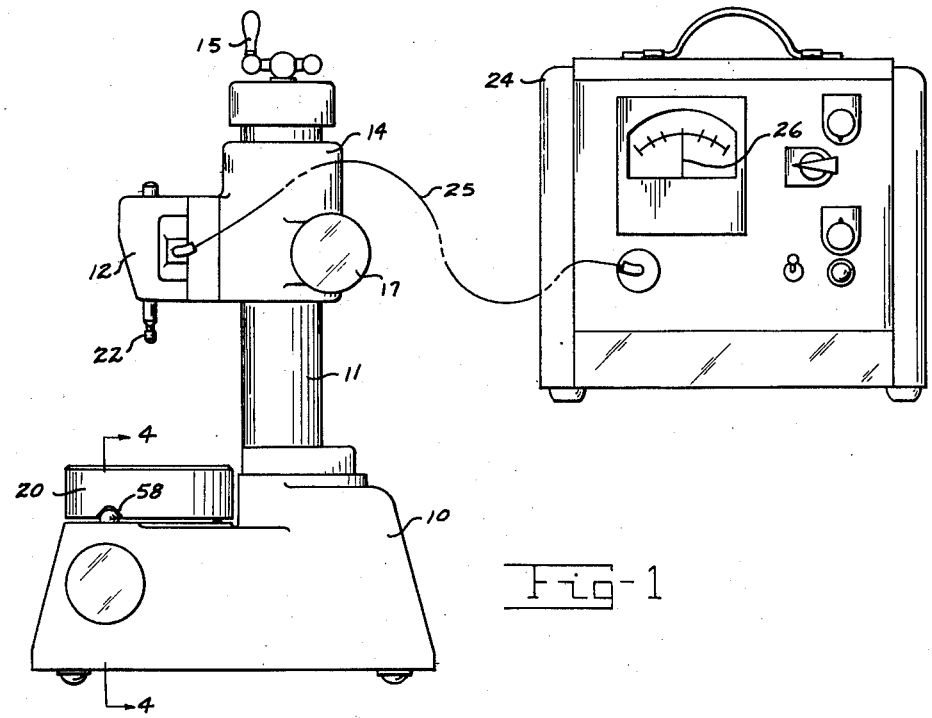
Figure 2:
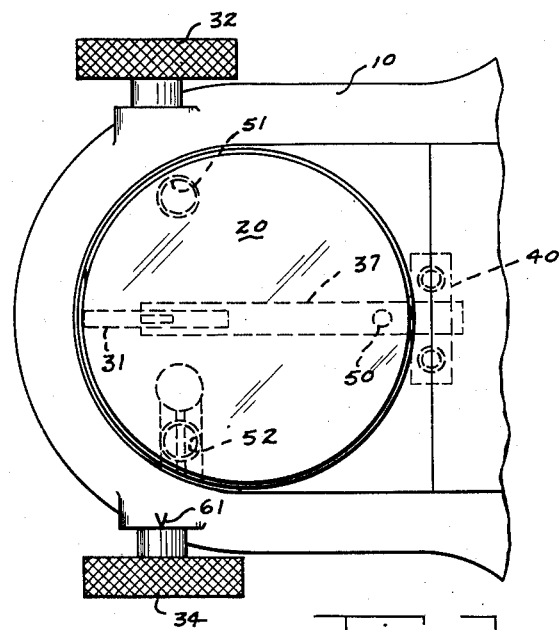
Figure 3:
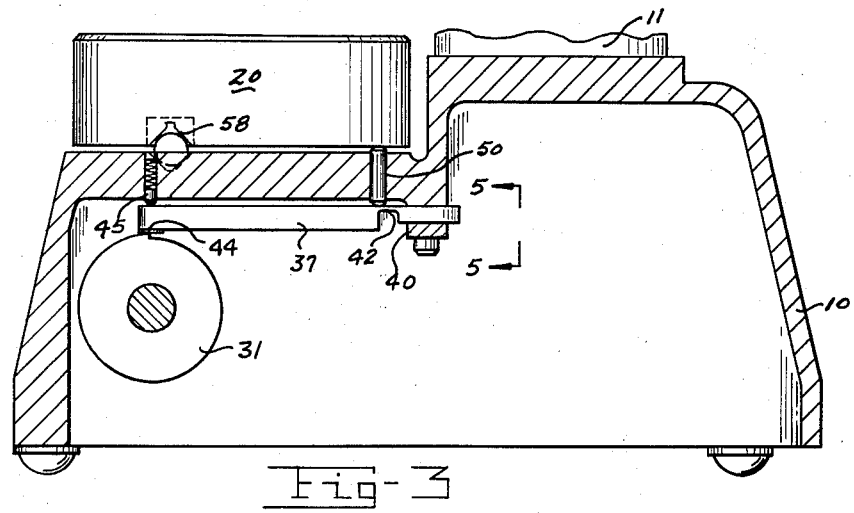
Figure 4:
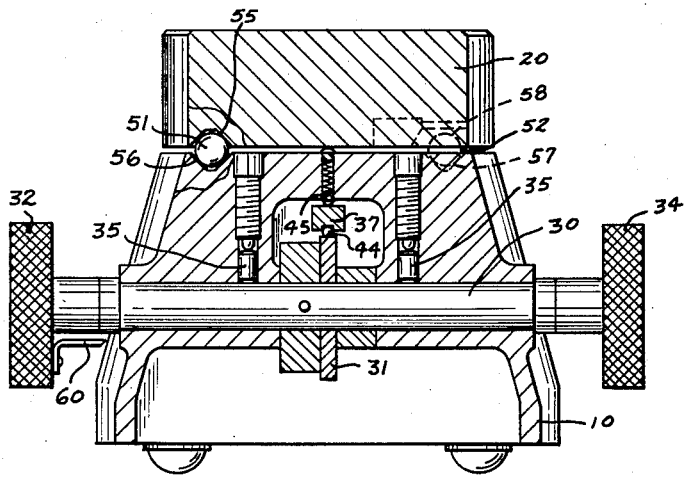
Figure 5:
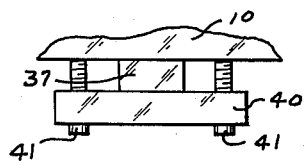

Other objects and advantages of the invention will be apparent from the following description, the appended claims and the accompanying drawings, in which:

Fig. 1 illustrates a comparator gage for measuring gage blocks or the like embodying the present invention, Fig. 2 is a plan view of the work support portion of the comparator, Fig. 3 is a longitudinal central section through the comparator base, Fig. 4 is a section through the lower portion of the comparator, taken on line 4—4 of Fig. 1, and Fig. 5 is a fragmentary view on line 5—5 of Fig. 3.

By way of exemplification, the invention has been illustrated herein as embodied in a comparator of high precision for measuring gage blocks or the like. It will be understood by those skilled in the art, however, that the present invention may be adapted to a large variety of other devices and applications. Accordingly, even though one particular embodiment of the invention has been shown and described in some detail, there is no intention to thereby limit the invention to such embodiment, but, on the other hand, I intend to cover all modifications and alternative constructions falling within the spirit and the scope of the invention as expressed in the appended claims.

In precision gaging devices such as gage block comparators relative adjustments between the gage head and work are necessary. For example, in comparing production gage blocks with master reference blocks a comparator gage head would first be brought into association with the master block and the block and head relatively positioned to obtain a reference indication on an indicator. Then, when the production block is placed in gaging position, the indicator will indicate the deviation of the block dimension from that of the master.

In gaging a large number of blocks, it is necessary that these comparator adjustments be made as rapidly as possible but with extreme precision.

In the illustrated embodiment of the invention a work support or anvil is carried for rocking movement on a comparator base. A gage head carried for coarse vertical positioning along a post extending from the base has a work contactor positioned in accordance with work displacement along a measuring axis extending to one side of the support rocking axis. Manually actuated fine adjustment means, shown as a rotatable cam and follower, serve to rock the work support through minute displacements about the rocking axis and thus position the work along the measuring axis.

Referring more particularly to the drawings, Fig. 1 illustrates an exemplary comparator including a massive cast base 10 for rigidity. A vertical post 11 carries a gaging assmebly 12 for vertical positioning. Mounting bracket 14 moves vertically along post 11 to position assembly 12 when crank 15 is rotated. Crank 15 turns a lead screw, not shown, threaded through a portion of bracket 14. This provides a coarse vertical positioning of the gage head. Gaging assembly 12 is releasably clamped to column 11 by a knob 17.

A work support or anvil 20 is provided on base 10 to support a gage block or other work to be measured. In this exemplary system the gage head is electric and is controlled by a movable work contactor 22. The gage head is connected to an amplifying and indicating unit 24 through an electric conduit 25. Pointer 26 responds to movements of work contactor 22. The coarse adjustment, gaging assembly and amplifier are of conventional and commercially available construction and for that reason have not been illustrated in detail.

A rotatable shaft 30 extends transversely through base 10. Cam 31, fixed to shaft 30 at its midpoint, has a gentle, uniform rise along its periphery which has been exaggerated in Fig. 3 for illustrative purposes. Knobs 32 and 34 at each side of the base serve to rotate shaft 30 and obtain adjustments of cam 31. Shaft 30 is held in its rotated position by plugs 35 of brass or the like spring-urged into engagement with the shaft at each side of cam 31.

A lever 37 is clamped at one end to base 10 by a bar 40 and bolts 41 (see Figs. 3 and 5). Lever 37 has a reduced portion 42 providing a lever pivot axis. Contact 44 at the free end of lever 37 engages the periphery of cam 31 and is vertically positioned by cam rotation. Spring-urged plunger 45 maintains contact 44 in engagement with the cam.

An actuating pin 50, vertically slidable in the upper portion of base 10, engages lever 37 between the reduced section pivot axis 42 and contact 44. At its upper end pin 50 engages anvil 20.

Anvil 20 is supported for rocking movement on base 10 by a pair of relatively spaced balls, 51 and 52, seated in the upper surface of base 10 and the lower surface of anvil 20. Ball 51 seats in opposed conical depressions 55 and 56 provided respectively in anvil 20 and base 10. Ball 52 is seated in a conical depression 57 in base 10 and engages an elongated groove 58 in anvil 20 extending toward ball 51. Through provision of elongated groove 58, while anvil 20 is precisely carried for adjustment, the relative spacing of the ball seats is not critical because of the direction and length of seating groove 58. This provides an extremely rigid and precise anvil support which is simple in construction and which minimizes critical dimensions.

Actuating pin 50 engages anvil 20 at a point equidistant from balls 51 and 52. Work contactor 22 is directly above the midpoint of anvil 20 and a block or the like to be measured is placed on anvil 20 substantially equidistant between the balls and the engaging point of the pin. The measuring axis extends to one side of the axis about which anvil 20 rocks. When either of knobs 32 and 34 is rotated, cam 31 moves the outer or free end of lever 37 vertically. Actuating pin 50 engages lever 37 adjacent its pivot axis and moves in response to cam rotation but with a greatly reduced displacement. Because the work is supported between the anvil rocking axis provided by balls 51 and 52 and the engagement point of pin 50 the actual work movement resulting from cam rotation is still further reduced. This allows comparatively large rotations of knobs 34 with extremely fine work movements and makes it possible to rapidly obtain fine adjustments without tedious manipulation. In one commercial assembly the total rise on cam 31 is .009 inch and the total vertical movement of the center point of anvil 20 (work movement) resulting from a full cam rotation is .000040 inch. Because of the minute movements involved no significant error is introduced through rocking of the part.

Through the present invention the de-amplification obtained between the rise on cam 31 and the movement of the center point of anvil 20 can be easily adjusted. By releasing bolts 41 lever 37 can be slid endwise to vary the relation of its pivot or swinging axis relative to cam 31 and pin 50, thus varying the ratio of the effective lever arms. When the desired response is obtained bolts 41 are tightened to clamp one end of lever 37 in position and the apparatus is ready for use.

It is desirable during set up and the initial rough or coarse positioning of the gaging assembly to have available a range of adjustment of anvil 20 in both directions, up and down. A pointer 60 is fixed to knob 32 at a point diametrically opposite the high point of cam 31. When pointer 60 is in line with reference marking 61 on base 10 it indicates that contact 44 is at the midpoint of the rise on cam 31 and that adjustment range is available in either direction.

Thus, it is seen that a comparator gage has been provided having a fine work positioning adjustment with a smooth and even action and which can be used to reliably obtain minute adjustments without time-consuming or tedious manipulation. Through disposition of the adjustment in this base maximum rigidity is obtained. The adjustment structure and rockable work support are extremely simple and economical to manufacture and reliable for long service of precision operation. An adjustable amplification is provided which can be quickly and easily made either during manufacture or for operations as required.

What is claimed is:

1. A comparator gage comprising a base, a work support, means on said base mounting said work support for rocking movement about an axis including a pair of relatively spaced rocking contacts between said support and base establishing said axis, gaging means carried by the base responsive to work displacements along a measuring axis intersecting the work support at a point to one side of the rocking axis, and manually actuated fine adjustment means supported by said base including a third supporting contact spaced from each of said rocking contacts adjustable for rocking the work support about said rocking axis through a minute range of adjustment to bodily position the work along the measuring axis.

2. A comparator as set forth in claim 1 wherein said fine adjustment means comprises a manually rotatable cam in said base having a gentle rise along its periphery, and actuating means cooperating between the periphery of said cam and said third supporting contact for adjustment thereof to position said work support.

3. A comparator gage comprising a base, a work support, means on said base mounting said support for rocking movement about an axis, a gage head having a movable work contactor, means mounting said gage head on said base and disposing said work contactor for movement along a measuring axis intersecting the work support at one side of the support rocking axis, a cam carried for rotation in said base, said cam having a minute rise along its periphery in operative association with said work support, and manually actuated means connected to rotate said cam for rocking the work support about the rocking axis through a minute range of adjustment to bodily position the work along the measuring axis.

4. A comparator gage as set forth in claim 3 wherein said mounting means comprises at least one ball seated between the base and support to accurately carry the support for rocking movement.

5. A comparator gage comprising a base, a work support, means on said base mounting said work support for rocking movement about a horizontal axis, a gage head, means carrying said gage head for coarse vertical positioning above said work support, the gage head having a work contactor operable along a vertical measuring axis intersecting the work support at one side of the support rocking axis, and manually actuated fine adjustment means in said base for rocking the work support about said horizontal axis through a minute range of adjustment to bodily position the work along the measuring axis.

6. A comparator gage comprising a base, an adjustable work support on said base, a gage head carried by said base for coarse adjustment relative to said work support, a cam carried in said base for rotation about an axis extending transverse of the base, said cam having a gentle rise along its periphery, follower means cooperating between the periphery of said cam and said support for adjustably positioning said support upon cam rotation, and manually rotatable means connected to rotate said cam and obtain fine adjustments of said work support through the cooperating follower means.

7. A comparator as set forth in claim 6 comprising a shaft extending transversely through said base and carrying said cam, and knob means at each end of said shaft whereby fine adjustments can be made at either side of the base.

8. A comparator gage comprising a base, an adjustable work support on said base, a gage head adjustably carried on said base, actuating means in said base to position said work support for fine adjustment of work carried thereby, manually adjustable means connected to said actuating means having a given effective range of movement, said actuating means including adjustable amplification control means for varying the amount of work support adjustment in response to a given movement of said manually adjustable means.

9. A comparator gage comprising a base, an adjustable work support on said base, a gage head carried by said base for coarse adjustment relative to said work support, a cam movably carried in said base, follower means cooperating between said cam and said work support for adjustably positioning said support upon cam movement, said follower means including a lever pivoted in said base, said cam cooperating with said lever at one point displaced from the lever pivot axis, actuating means cooperating with said work support and with said lever at a point between said one point and the lever pivot axis, and manually actuated means operatively connected to move said cam and adjustably position said support through said follower means, whereby major adjustments of the manually actuated means result in fine movements of the work support.

10. A comparator gage comprising a base, a work support, means mounting said work support on said base for movement about a rocking axis comprising a pair of relatively spaced balls seated both in the base and work support, a gage head adjustably carried on said base responsive to work displacement along a measuring axis intersecting the work support at one side of the rocking axis, and manually actuated means operatively connected to obtain fine adjustments of said work support about the rocking axis and position work carried thereby along the measuring axis.

11. A comparator gage comprising a base, an adjustable work support on said base, a gage head adjustably carried on said base, a cam carried in said base for rotation about an axis extending transverse of the base, a lever mounted in said base for pivoting movement, the free end of the lever engaging the cam periphery for movement upon cam rotation, actuating means engaging said lever between the lever pivot axis and its free end extending into engagement with said work support, and manual means for adjustable rotation of said cam for obtaining fine adjustments of the work support position.

12. A comparator as set forth in claim 11 wherein said lever has a reduced section forming a lever pivot axis, and comprising releasable clamp means between said base and one end of said lever for endwise adjustment of the lever to vary the position of the lever pivot axis relative to said cam and actuating means, whereby the effective lever arms are adjustably varied and the work support movement for a given cam rotation is controlled.

13. A comparator gage comprising a base, a work support, means adjustably mounting said work support on said base, a gage head carried by said base, a cam carried in said base for rotation about an axis extending transverse of the base, said cam having a gentle progressive rise along its periphery, a lever having a reduced section adjacent one end thereof forming a lever pivot axis, means adjustably clamping said one end of the lever in said base, the free end of the lever engaging the cam periphery, an actuating pin slidable in said base engaging said lever between the reduced section and the free end thereof and extending into engagement with the work support, and manually rotatable means connected to rotate said cam and obtain fine adjustments of said work support.

14. A comparator gage comprising a base, a work support, means mounting said work support for rocking movement on the base, a gage head having a movable work contactor, means on said base for coarse positioning of said gage head and disposing said work contactor for movement substantially along a measuring axis intersecting the support at one side of the rocking axis, a rotatable shaft extending transversely through said base, a cam fixed to said shaft, said cam having a gentle rise along its periphery, a lever pivotly carried in said base having a free end in engagement with the cam periphery, an actuating pin operative between said lever and said work support, said mounting means comprising a pair of relatively spaced balls seated between the work support and base, and knob means at each end of said shaft for rotating said cam and obtaining fine adjustments of the work support about the rocking axis to vertically position work carried thereby between the supporting balls and actuating pin along the measuring axis.

15. A comparator gage comprising a base, an adjustable work support on said base, a gage head carried by said base for coarse adjustment relative to said work support, a cam movably carried in said base, follower means cooperating between said cam and said work support for adjustably positioning said support upon cam movement, said follower means including a lever pivoted in said base, said cam cooperating with said lever at one point relatively remote from the lever pivot axis, actuating means cooperating with said work support and with said lever at a point relatively adjacent the lever pivot axis, and manually actuated means operatively connected to move said cam and adjustably position said support through said follower means, whereby major adjustments of the manually actuated means result in fine movements of the work support.

References Cited in the file of this patent

UNITED STATES PATENTS

| 1,422,161 | Woodrow | July 11, 1922 |
| 2,220,280 | Richards | Nov. 5, 1940 |
| 2,412,665 | Young | Dec. 17, 1946 |
| 2,826,818 | Roeger | Mar 18, 1958 |

FOREIGN PATENTS

| 340,492 | Germany | Sept. 14, 1921 |